United States Patent Office 3,294,639
Patented Dec. 27, 1966

3,294,639
TREATMENT OF INFLAMMATORY DISEASES
William Chalmers, Arthur Clarence Wood, and Alexander John Shaw, Vancouver, British Columbia, Canada, and John Julius Majnarich, Bothell, Wash., assignors to Eversharp, Inc., a corporation of Delaware
No Drawing. Filed Feb. 3, 1964, Ser. No. 342,274
5 Claims. (Cl. 167—65)

This invention relates to the treatment of some inflammatory diseases by administering compounds variously known as alpha-glyceryl ethers or alpha-alkoxyglycerols. More particularly it relates to a method of relieving the inflammation, pain, and crippling associated with inflammatory collagen diseases, for example rheumatoid arthritis and gouty arthritis, by the administration of the above mentioned alpha-glyceryl ethers.

Arthritis and the related rheumatic diseases in man and animals are treated today by the administration of one or more of a group of drugs. The adrenocorticosteroids, such as hydrocortisone, prednisone and the more recently developed fluoroderivatives, are widely used. Gold salts, salicylates, phenylbutazone and certain anti-malarials, such as, 4-aminoquinoline are also regarded as useful in the treatment of arthritis.

The adrenocorticoid steroids possess pronounced anti-inflammatory properties and have proved very successful in the treatment of rheumatic conditions. However, these drugs cause certain undesirable side effects which limit their usefulness. Such side effects, which may be demonstrated by tests on animals such as rats, are: the retention of sodium and excretion of potassium, loss of body weight, atrophy of the adrenal and thymus gland and interference in several ways with the course of energy production. The ability of a substance to reduce inflammation induced in rats by a chemical irritant is considered to be a good screening test for anti-inflammatory potentiality. The "granuloma pouch" test has been developed as a measure of the anti-inflammatory ability of different substances. A description of the "granuloma pouch" test can be found in Roberts and Nezamis, Acta Endocrinologia, 25, 105–112, 1957.

Our experiments with rats have shown that certain alpha-glyceryl-ethers can be compared with hydrocortisone as anti-inflammatory agents. These tests have also shown that when these alpha-glyceryl ethers are administered to rats, the salt balance is not significantly altered. Whereas hydrocortisone, and other adrenocorticosteroids, cause atrophy of the adrenal and thymus gland the impair weight gains in young animals, alpha-glyceryl ethers have no adverse effect on these glands and do not seriously impair weight gain in young animals.

These alpha-glyceryl ethers can be administered in accordance with this invention in the form of a composition suitable for oral or parenteral administration. Thus, for example, compositions for oral administration may be solid or liquid and may take the form of capsules, tablets, granules, coated tablets, emulsions, syrups, suspension or oil solutions, such compositions comprising carriers or excipients including lactose, talc, kaolin, potato and maize starches and magnesium stearate, and a suitable capsule material is gelatine.

For parenteral administration, the carrier or excipient may be a sterile, parenterally acceptable liquid, as known in the art.

Advantageously, the compositions may be formulated as dosage units, each unit being adapted to supply a fixed dose of active ingredient. Tablets, coated tablets, capsules, emulsions, solutions, and ampoules are examples of preferred dosage unit forms of the compositions.

Preferred alpha-glyceryl ethers which have been found to be particularly effective are chimyl, selachyl and batyl alcohol.

Chimyl alcohol is the hexadecyl (or cetyl) 1-monoether of glycerol, having the formula

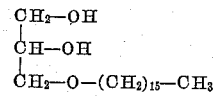

The molecular structure of chimyl alcohol is characterized by the presence of two "vicinal" hydroxyl groups and the saturated "cetyl" group attached to the glyceryl frame by an ether oxygen linkage. Chimyl alcohol is a white powder with a soft unctuous feel. It is secured as glistening plates when crystallized from acetone. It has a melting point of 62–63° C. It is insoluble in water and slightly soluble at room temperature in glyceride oils and acetone, more soluble in the warm.

It occurs in the unsaponifiable matter of a number of fish liver oils and may be isolated in known manner from this source in a therapeutically acceptable form.

Selachyl alcohol is the octadecenyl (oleyl) 1-monoether of glycerol, having the formula

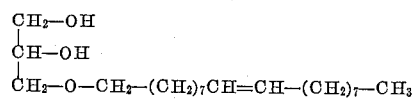

The molecular structure of selachyl alcohol is characterized by the presence of two "vicinal" hydroxyl groups and the unsaturated "oleyl" group attached to the glyceryl frame by an ether oxygen linkage. Selachyl alcohol is, at room temperatures, an oily liquid which, when pure, is completely colorless. It is insoluble in water but is miscible at room temperatures with glyceride oils and most of the common solvents.

It occurs in the unsaponifiable fraction of a number of fish liver oils. It may be manufactured in therapeutically acceptable form.

Batyl alcohol is the octadecyl 1-monoether of glycerol, having the formula

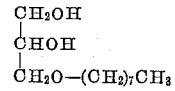

The molecular structure of batyl alcohol is characterized by the presence of two "vicinal" hydroxyl groups and the saturated "stearyl" group attached to the glyceryl frame by an ether linkage. Batyl alcohol is a white powder with a soft unctuous feel. It is secured as glistening plates when crystalized from acetone. It has a melting point of 69–71° C. It is insoluble in water but is slightly soluble at room temperatures in vegetable oils, methyl alcohol, chlorinated solvents and other liquid solvents. It can be identified by its bis-p-nitrobenzoate which forms pale yellow needles from methanol with a melting point of 65–66° C.

Batyl alcohol can be prepared by hydrogenation of selachyl alcohol, which may be obtained from the oil from livers of *Squales succklii* or *Chimaera monstrosa* or Elasmobranchs of related species. Batyl alcohol itself may also be obtained from these fish liver oils.

The invention will now be illustrated by reference to the following examples:

Example 1

A series of tests were conducted on rats and the Tables I and II display the results of typical granuloma pouch assays. Additional data were secured by measurement of the sodium and potassium contents of the urine, the weight gain, and after sacrifice of the animals, the weights of the adrenal and thymus glands.

In the granuloma pouch assays, chimyl alcohol suspended in 0.5 ml. of cottonseed oil, was fed orally each day for 7 days to Sprague-Dawley strain of rats with weights which are shown in each table presented. All the rats in the experiments were fed a synthetic diet normally used for experimental work. The pouch test was carried out as follows: Croton oil is injected into a pneumoderm in the middle of the dorsal skin of the rat. Air is withdrawn the following day. Seven days after the formation of the pouch, the pouch exudate is removed and its weight determined. The anti-inflammatory and other activity of hydrocortisone was also determined for comparison and the results included in the Tables I and II.

Example 2

A series of tests were conducted on rats and Tables III–VI display the results of typical pouch assays. Additional data were secured by measurement of the sodium and potassium contents of the urine, the weight gain, and after sacrifice of the animals, the weights of the adrenal and thymus glands.

TABLE I.—EFFECT OF DIFFERENT LEVELS OF CHIMYL ALCOHOL (NATURAL) CHIMYL ALCOHOL (SYNTHETIC) WITH HYDROCORTISONE AND COTTONSEED OIL CONTROL UPON BODY WEIGHT, GRANULOMA POUCH EXUDATE WEIGHT AND ADRENAL WEIGHT

[Rats used in this study were mixed sexes weighing an average of 93 grams at start of the experiment.]

| Test Material mg./rat/day | Rats/Group | Weight Gain, grams | Pouch Exudate Weight, gms. | Adrenal Weight, mg. |
|---|---|---|---|---|
| Chimyl Alcohol (natural): | | | | |
| 0.100 | 7 | 15.0 | 8.9 | 34.0 |
| 0.400 | 7 | 21.1 | 4.2 | 34.1 |
| Chimyl Alcohol (synthetic): | | | | |
| 0.100 | 7 | 21.8 | 9.7 | 34.4 |
| 0.400 | 7 | 20.0 | 7.4 | 33.9 |
| Hydrocortisone: | | | | |
| 0.050 | 7 | 27.4 | 9.8 | 29.6 |
| 0.400 | 7 | 15.0 | 4.3 | 24.4 |
| Cottonseed Oil Control: (no additive) 0.5 ml | 7 | 24.0 | 15.6 | 33.5 |

TABLE II.—COMPARISON OF CHIMYL ALCOHOL (NATURAL), CHIMYL ALCOHOL (SYNTHETIC) COMPARED WITH HYDROCORTISONE AND COTTONSEED OIL. ON BODY WEIGHT, GRANULOMA POUCH WEIGHT, ADRENAL WEIGHT, THYMUS WEIGHT AND URINE SODIUM AND POTASSIUM

[Rats used in this study were all males weighing an average of 196.3 grams at the start of experiment.]

| Test Material in 0.5 ml. mg./rat/day | Number of rats in group | Weight gain (av.), gms. | Pouch Exudate weight, gms. | Urine Salt Excretion* Sodium mg. | Urine Salt Excretion* Potassium mg. | Na/K ratio | Adrenal Gland Wt., mg. | Thymus Gland Wt., mg. |
|---|---|---|---|---|---|---|---|---|
| Chimyl Alcohol (natural): 0.80 | 6 | 35.7 | 14.5 | 37.18 | 24.38 | 1.52 | 41.6 | 683 |
| Chimyl Alcohol (synthetic): 0.80 | 6 | 30.6 | 10.3 | 16.69 | 9.28 | 1.80 | 39.8 | 715 |
| Hydrocortisone: 0.40 | 4 | 16.3 | 7.32 | 13.41 | 20.60 | 0.65 | 23.5 | 360 |
| Cottonseed Oil Control: 0.5 ml | 6 | 37.2 | 19.9 | 21.63 | 12.20 | 1.77 | 46.0 | 720 |

*Average results from the pooled urine of each rat collected during the test period.

TABLE III.—EFFECT OF DIFFERENT LEVELS OF SELACHYL ALCOHOL ON BODY WEIGHT, ADRENAL WEIGHT AND GRANULOMA POUCH EXUDATE WEIGHT AS COMPARED TO HYDROCORTISONE AND COTTONSEED OIL VEHICLE CONTROL

[Six rats per group. Average starting weight of rats 113.1 grams (mixed sexes).]

| Test Material | Dose/day of Sample, mcg./rat | Average Wt. Gain, gms./rat | Average Exudate Wt., gms./rat | Average Adrenal Wt., mgs./rat |
|---|---|---|---|---|
| Control (Cottonseed oil) | [1] 0.5 | 31.3 | 8.4 | 43.6 |
| Hydrocortisone | 500 | 23.5 | 4.8 | 33.5 |
| Selachyl Alcohol | 75 | 50.1 | 4.5 | 45.2 |
| Selachyl Alcohol | 150 | 47.8 | 3.7 | 43.3 |
| Selachyl Alcohol | 300 | 39.3 | 4.2 | 41.9 |
| Selachyl Alcohol | 600 | 46.6 | 3.2 | 39.3 |

[1] Millileter.

TABLE IV.—EFFECT OF DIFFERENT LEVELS OF SELACHYL ALCOHOL ON BODY WEIGHT, ADRENAL WEIGHT, GRANULOMA POUCH EXUDATE WEIGHT, THYMUS WEIGHT AND URINE SODIUM-POTASSIUM LEVELS AS COMPARED TO HYDROCORTISONE AND COTTONSEED OIL VEHICLE

[All animals in this group were males weighing an average of 197 grams at the start of the experiment.]

| Test Material in 0.5 m. vehicle mg./rat/day | Number of rats in group | Weight gain (av.), gms. | Pouch Exudate Weight, gms. | Urine Salt Excretion [1] Sodium mg. | Urine Salt Excretion [1] Potassium mg. | Na/K ratio | Adrenal Gland Wt., mg. | Thymus Gland Wt., mg. |
|---|---|---|---|---|---|---|---|---|
| Selachyl Alcohol: | | | | | | | | |
| 0.50 | 6 | 25.7 | 5.1 | [2] 18.55 | [2] 9.55 | 1.94 | 40.4 | 753 |
| 1.0 | 6 | 30.4 | 3.1 | 17.95 | 9.31 | 1.93 | 42.7 | 700 |
| 2.0 | 5 | 24.8 | 2.5 | 27.48 | 12.66 | 2.17 | 43.5 | 704 |
| Hydrocortisone: 0.40 | 4 | 16.3 | 7.32 | 13.41 | 20.60 | 0.65 | 23.5 | 360 |
| Cottonseed Oil Control: 0.5 ml | 6 | 37.2 | 19.9 | 21.63 | 12.20 | 1.77 | 46.0 | 720 |

[1] Average results from the pooled urine of each rat collected during the test period.
[2] Based on five animals.

TABLE V.—EFFECT OF DIFFERENT LEVELS OF SELACHYL ALCOHOL, HYDROCORTISONE AND COTTONSEED OIL ON BODY WEIGHT GAIN, GRANULOMA POUCH EXUDATE WEIGHT AND ADRENAL WEIGHT

[Animals were mixed sexes weighing an average of 93 grams at start of the experiment.]

| Test Material mg./rat/day | Rats/Group | Weight Gain, grams | Pouch Exudate Weight, gms. | Adrenal Weight, mg. |
|---|---|---|---|---|
| Selachyl Alcohol: | | | | |
| 0.025 | 8 | 34.6 | 11.4 | 34.7 |
| 0.050 | 8 | 33.4 | 9.9 | 34.0 |
| 0.100 | 8 | 32.5 | 6.5 | 34.0 |
| 0.200 | 8 | 22.9 | 4.7 | 33.6 |
| Hydrocortisone: | | | | |
| 0.050 | 7 | 27.4 | 9.8 | 29.6 |
| 0.400 | 7 | 15.0 | 4.3 | 24.4 |
| Cottonseed Oil Control (no additive) 0.5 ml. | 7 | 24.0 | 15.6 | 33.5 |

TABLE VI.—FOURTEEN DAY TOXICITY STUDY OF SELACHYL ALCOHOL ADMINISTERED ORALLY TO RATS

[Groups of five animals.]

| Dose Volume ml./k | Initial Weight (av.), gms. | Wt. Gain (14 days), av. gms. | Adrenal Weight, mg. | Thymus Weight, mg. | Blood Tests | | | Survivors |
|---|---|---|---|---|---|---|---|---|
| | | | | | Hb | RBC | WBC | |
| Control | 161.2 | 50.4 | 46.6 | 690 | 14.7 | 10.6 | 10.2 | 5 |
| 0.5 | 158.3 | 20.4 | 44.6 | 676 | 14.7 | 9.9 | 9.2 | 5 |
| 1.0 | 171.0 | 31.0 | 45.0 | 685 | 14.2 | 9.3 | 8.6 | 5 |
| 2.0 | 174.2 | 24.0 | 58.8 | 679 | 13.5 | 9.7 | 7.6 | 5 |
| 3.0 | 174.3 | 2.4 | 53.4 | 656 | 11.9 | 8.5 | 7.0 | 5 |
| 5.0 | 151.2 | Loss 23 | 47.0 | 663 | 9.4 | 7.4 | 5.6 | [1] 3 |
| 10.0 for 4 days [2] | | | | | | | | Day 4, 2; Day 5, 1; Day 7, 0 |

[1] Calculations are based on the weight of survivors.
[2] Four animals only.

In the pouch assays, selachyl alcohol made up to a volume of 0.5 ml. with cottonseed oil, was fed orally each day for 7 days to Sprague-Dawley strain of rats with weights which are shown in each table presented. All the rats in the experiments were fed a synthetic diet normally used for experimental work. The pouch test was carried out as in the previous example. The results are presented in Tables III–VI.

In the tests, batyl alcohol, dissolved in 0.5 ml. of cotton seed oil, was fed orally each day for seven days to a Sprague-Dawley strain of rats with an average weight of 195 grams. All the rats in the experiment were fed a synthetic diet normally used for experimental work. The pouch test was carried out as in the previous examples. The results which were obtained are shown in Table VII.

TABLE VII.—GRANULOMA POUCH ASSAY OF BATYL ALCOHOL WITH ACCOMPANYING LABORATORY FINDINGS

[Rats used in this experiment were all males weighing an average of 194.7 gms. at start.]

| Test Material in 0.5 ml. mg./rat/day | Number of rats in group | Weight gain (av.), gms. | Pouch Exudate Weight, gms. | Urine Salt Excretion [1] | | Ratio | Adrenal Gland Wt., mg. | Thymus Gland Wt., mg. |
|---|---|---|---|---|---|---|---|---|
| | | | | Sodium, mg. | Potassium, mg. | | | |
| Batyl alcohol (in cottonseed oil): | | | | | | | | |
| 0.80 | 6 | 28.5 | 6.0 | 17.16 | 8.59 | 2.0 | 47.4 | 732 |
| 4.00 | 6 | 32.8 | 5.2 | 23.43 | 13.96 | 1.68 | 46.6 | 734 |
| 8.00 | 6 | 28.7 | 6.2 | [2] 15.00 | [2] 8.04 | 1.86 | 45.2 | 734 |
| Hydrocortisone (in cottonseed oil): 0.40 | 4 | 16.3 | 7.3 | 13.41 | 20.60 | 0.65 | 23.5 | 360 |
| Cottonseed oil Control: 0.50 ml. | 6 | 37.2 | 19.9 | 21.63 | 12.20 | 1.77 | 46.0 | 720 |

[1] Average results from the pooled urine of each rat collected during the test period.
[2] Based on five animals.

It is our finding that selachyl alcohol is practically non-toxic when given at the required therapeutic level. In a toxicity study, the results of which are shown in Table VI, groups of rats were fed single large doses of selachyl alcohol. The animals were observed over a 14 day period and the results evaluated by deaths, weight gains, gland weights and blood tests.

In carrying out the test of Table VI the animals were first starved for 24 hours, weighed, and a dose of selachyl alcohol was administered directly into the stomach.

*Example 3*

A series of tests were run on rats to show a typical pouch assay. Additional data were secured by measurement of the sodium and potassium contents of the urine, the weight gain, and after sacrifice of the animals, the weights of the adrenal and the thymus glands.

*Example 3a*

A toxicity study was made in which rats in groups of six were fed daily doses of batyl alcohol. The animals were observed over a 14-day period and the results were evaluated by deaths, weight gains, gland weights and blood tests.

In carrying out this test the animals were first starved for 24 hours, weighed and the dose of batyl alcohol was administered each day directly into the stomach as a slurry in water. Each dose was calculated per kilo of body weight of each animal.

The results of the toxicity study are shown in Table VIII from which it will be seen that batyl alcohol is practically non-toxic when taken at the required therapeutic level.

TABLE VIII.—TOXICITY STUDY OF BATYL ALCOHOL ADMINISTERED ORALLY TO RATS

[Test period 14 days—six rats to each group.]

| Dose mg./kilo body wt. | Initial weight (av.), gm. | Weight gain (av.), gm. | Adrenal Weight, mg. | Thymus Weight, mg. | HB | Blood Tests | |
|---|---|---|---|---|---|---|---|
| | | | | | | RBC | WBC |
| Controls | 161.2 | 50.4 | 46.6 | 690 | 14.7 | 10.6 | 10.2 |
| 5 | 150.1 | 61.6 | 47.4 | 706 | 15.4 | 13.1 | 14.6 |
| 50 | 174.4 | 42.4 | 44.6 | 681 | 15.3 | 15.8 | 16.1 |
| 500 | 168.0 | 47.2 | 38.4 | 697 | 15.0 | 12.6 | 15.3 |
| 1,500 | 157.1 | 33.0 | 40.2 | 677 | 13.8 | 11.3 | 10.5 |
| 10,416 | 244.5 | −14.2 | 72.0 | 652 | 9.5 | 6.9 | 4.8 |
| (10 cc. slurry 250 mg./cc.) | | | | | | | |

No deaths were observed even at very large doses although the animals lost weight and their blood values were lowered.

What we claim as our invention is:

1. A method of treating inflammation in a warm-blooded animal which comprises administering an effective dose of a compound selected from the group consisting of batyl alcohol, chimyl alcohol, and selachyl alcohol.

2. A method as claimed in claim 1 in which said compound is administered orally.

3. A method as claimed in claim 1 in which the compound employed is batyl alcohol.

4. A method as claimed in claim 1 in which the compound employed is chimyl alcohol.

5. A method as claimed in claim 1 in which the compound employed is selachyl alcohol.

References Cited by the Examiner

Brohult I Nature, volume 181, No. 4621, pp. 1484–1485, May 24, 1958.

Brohult II Nature, volume 188, No. 4750, pp. 591–592, November 12, 1960.

Brohult III Nature, volume 193, No. 4822, page 1304, March 31, 1962.

JULIAN S. LEVITT, Primary Examiner.

L. B. RANDALL, Assistant Examiner.